(No Model.) 4 Sheets—Sheet 2.

G. F. BULEN.
ELECTRIC CIRCUIT TESTING APPARATUS.

No. 365,726. Patented June 28, 1887.

WITNESSES:
Willis Fowler
Chas. H. Luther Jr

INVENTOR
George F. Bulen
By Joseph A. Miller & Co.
Attys (No Model.) 4 Sheets—Sheet 3.
G. F. BULEN.
ELECTRIC CIRCUIT TESTING APPARATUS.

No. 365,726. Patented June 28, 1887.

WITNESSES:
Willis Fowler.
Chas. H. Luther Jr.

INVENTOR:
George F. Bulen
by Joseph A. Miller &c
Attys (No Model.)　　　　　　　　　　　　　　　　　4 Sheets—Sheet 4.
G. F. BULEN.
ELECTRIC CIRCUIT TESTING APPARATUS.

No. 365,726.　　　　　　　　　Patented June 28, 1887.

WITNESSES:　　　　　　　　　　　　　　INVENTOR:

UNITED STATES PATENT OFFICE.

GEORGE F. BULEN, OF JERSEY CITY, NEW JERSEY.

ELECTRIC CIRCUIT-TESTING APPARATUS.

SPECIFICATION forming part of Letters Patent No. 365,726, dated June 28, 1887.

Application filed July 8, 1886. Serial No. 207,395. (No model.)

*To all whom it may concern:*

Be it known that I, GEORGE F. BULEN, of Jersey City, Hudson county, and State of New Jersey, have invented certain new and useful Improvements in Electric Circuit-Testing Apparatus, of which the following is a full, clear, and exact description, reference being had to the accompanying drawings, forming part of this specification.

My invention relates to the apparatus or assemblage of electrical devices for testing the conditions of electric systems, which generally consist of a central office in constant electric communication with distant points for the purpose of receiving various kinds of signals and alarms.

The objects of my invention are to provide apparatus whereby the lines, instruments, batteries, and the usual adjuncts of a fire-alarm, burglar-alarm, or other electric systems may be automatically tested at certain predetermined intervals, and whereby any defects therein may be automatically detected and the fact signaled and announced automatically to the operator at the central office.

To the above purposes my invention consists in the novel combinations and sub-combinations of the various essential features of the apparatus, as hereinafter fully described and claimed.

Figure 1:
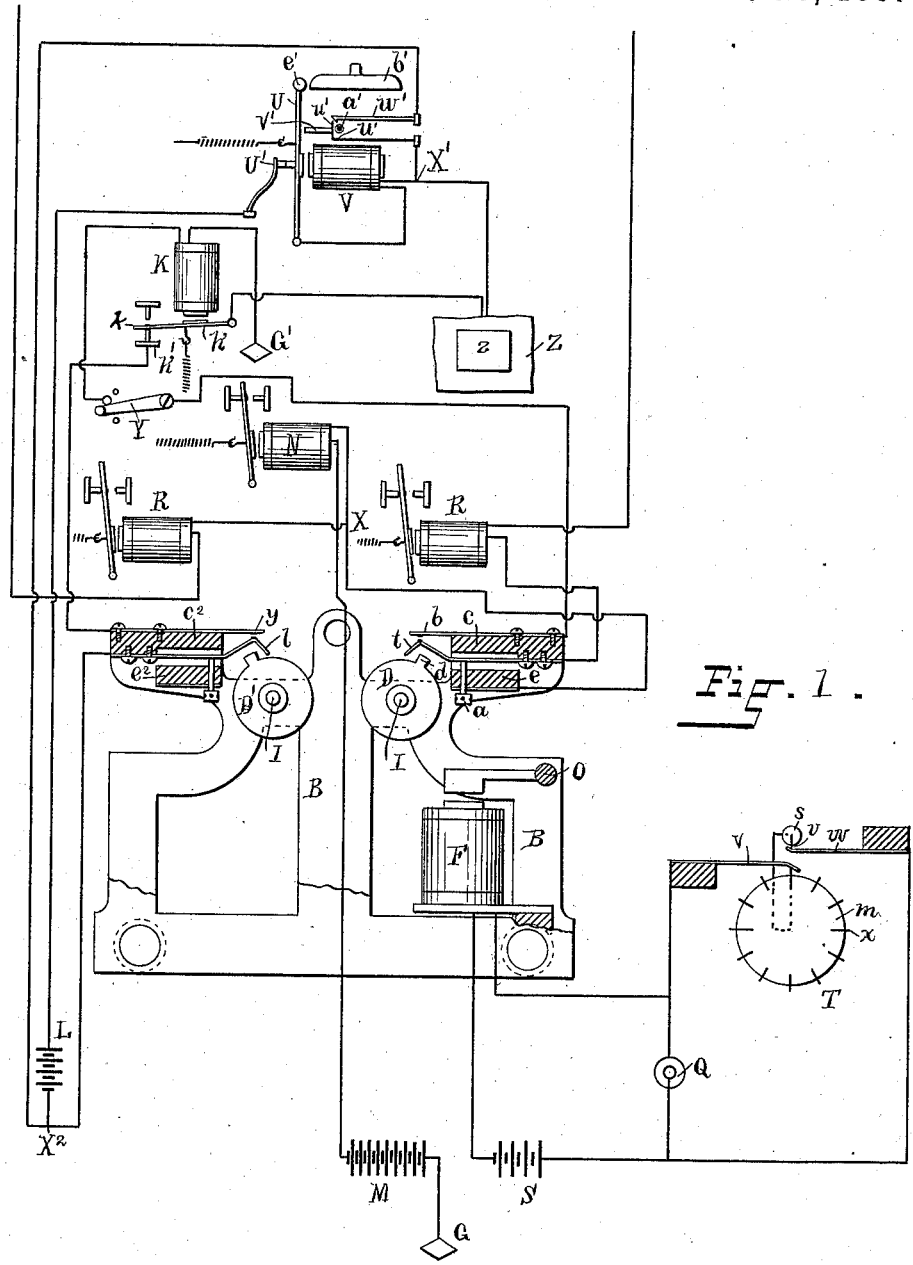
Figure 2:
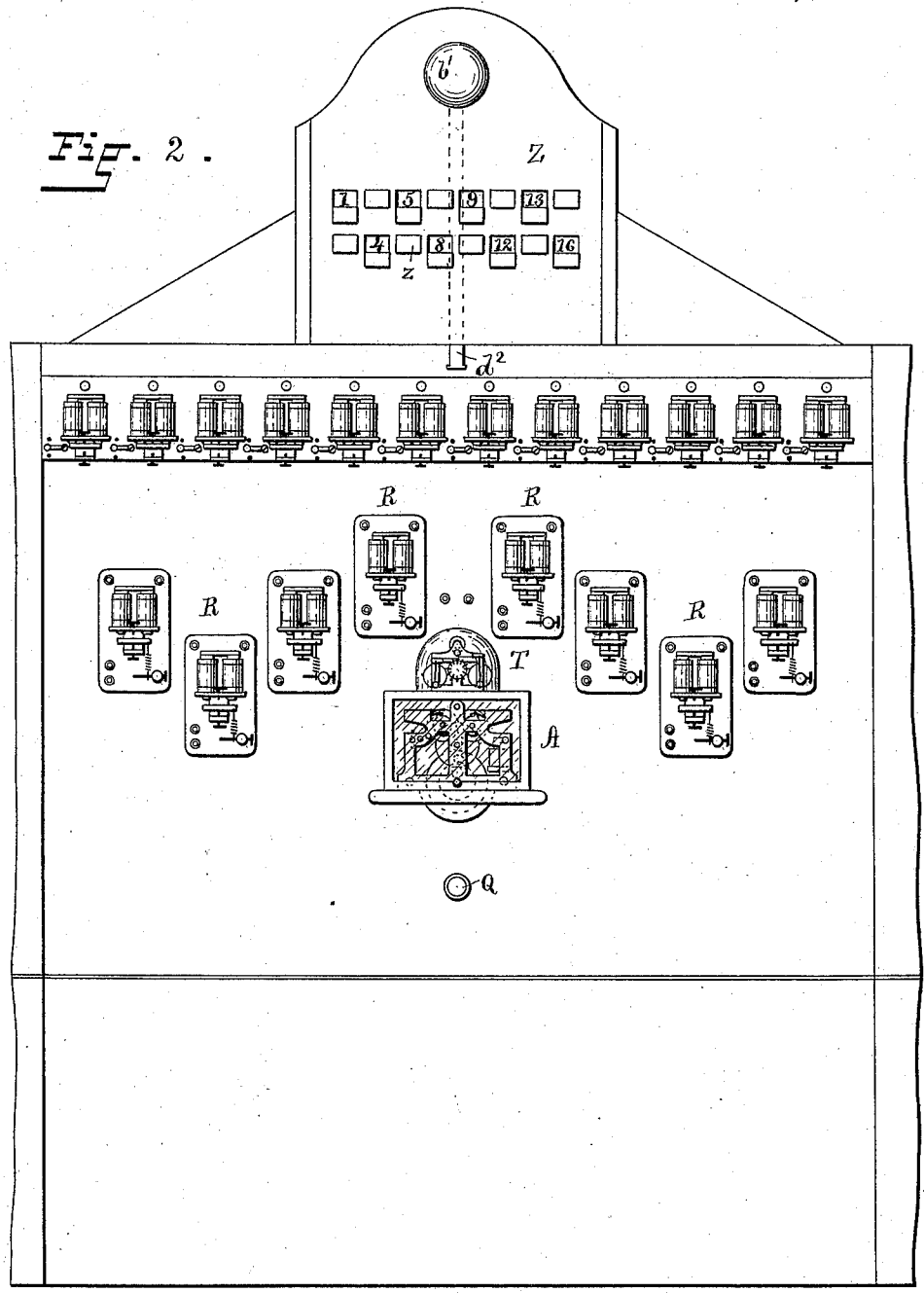
Figure 4:
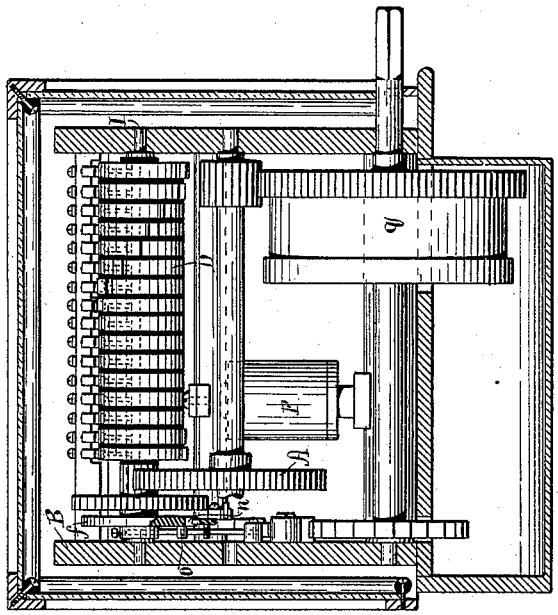
Figure 3:
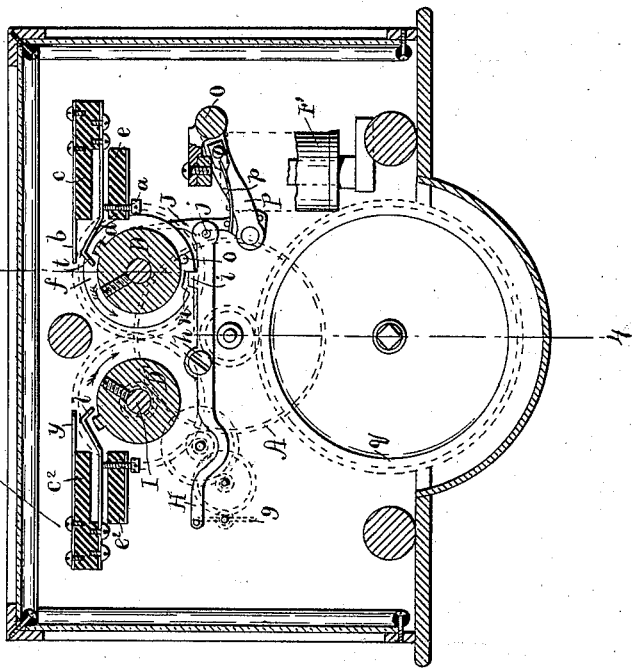
Figure 5:
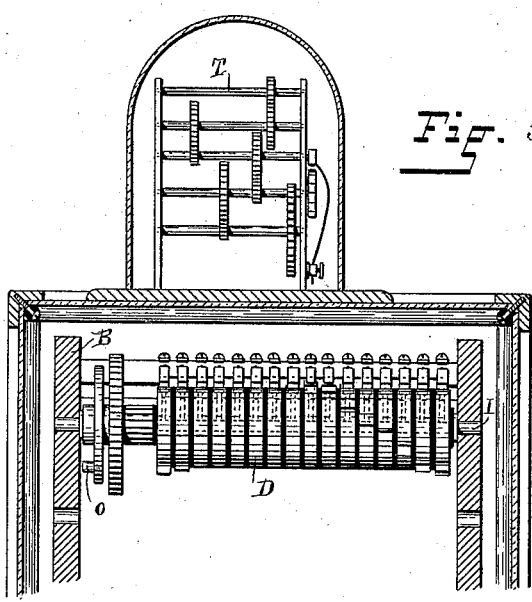

In the accompanying drawings, Figure 1 represents a diagrammatic view of the general arrangements and constructions of the testing apparatus, as connected up with a single loop-circuit, including a series of distant points not shown. Fig. 2 represents an enlarged front elevation of a portion of the apparatus, showing the disposition of the annunciator and of twelve actuating-relays, the periodically-operating circuit-switching device and moving contacts, and two sets of relays, all as arranged for twelve main lines, as hereinafter fully described. Fig. 3 represents a central sectional view of the tripping-cylinders, their co-operating switch-fingers, and the operating clock-train, the section being taken transverse to said cylinders. Fig. 4 represents a sectional view taken on line 4 4 of Fig. 3. Fig. 5 represents a similar sectional view to Fig. 4, showing the tripping-cylinder and the switch-fingers adjacent thereto, and a sectional view of the superposed moving contacts and their motor.

The motor for the tripping-cylinder is omitted and the lower portion of the casing is shown broken away.

In the said drawings like letters designate corresponding parts throughout.

Referring to Fig. 1, the diagram there shown illustrates the disposition and normal conditions of the apparatus as arranged at a central-office. The free ends of wire at the right and left hand top of said view represent the ends of the respective two branches of the main or line circuit, which may lead to several distant points containing any of the ordinary signaling mechanisms, as thermostats, telephones, signal-boxes, or the like, which govern at their respective points a ground-connection. The line-ground G and main battery M are located on the normally-closed ground-connection which meets the main line at a branch point, X. This line-ground connection is provided with a relay, N, which may control any form of the usual signaling or recording devices for registering an alarm sent thereon by means of the mechanisms at the different points grounding the line thereat. Each branch of the line-circuit is provided with a relay, R, which may serve as repeating instruments or the like.

At a point in one branch of the line is cut in a two-way switch consisting of the contact trip-finger *t*, co-operating with a front contact-stop, *a*, and a back contact-stop, *b*. These parts are suitably mounted on the insulating portions *c* and *e*, and the branch of the line is preserved over finger *t* and the front contact, *a*. This two-way switch is operated periodically by means of a wound clock-train, A, actuated by an electro-magnet, F, itself governed by the moving contacts, as I will describe farther on. The two-way switch *atb* is mounted, as shown, on the insulating portions *c* and *e*, set across the frame B, and likewise the tripping-cylinder is journaled across the frame B, so that the cylinder in revolving may trip the free end of the finger *t* and switch the same on its back contact, *b*. This cylinder is composed of as many flat metallic wheels D as there are circuits to be joined up for testing. The wheels D each have a radially-projecting cog, d, on the periphery and are keyed upon a rotary shaft, I, and are insulated from the same and from each other, since they are not designed to form part of a circuit at any time. The cylinder is rigidly mounted on the second-arbor of the spring-acted clock-train A, and in an obvious manner may be rotated thereby. The clock-train is provided with a retaining device which is governed by the actuating-magnet F. The armature-lever of magnet F is fixed to a rotary shaft, O, journaled in frame B, and to shaft O is attached an arm, P, to the outer end of which is pivoted the trip-lever J.

Near one end of the second-arbor of clock-train A is keyed a check-disk, f, provided with a peripheral notch, n, and an adjacent laterally-projecting stud, o. In revolving, the stud o on the disk f trips the trip-lever J at every complete revolution. The tilt-arm H is pivoted near its center, as at h, to a stationary point, and at the one end is provided with a fulcrum-pin, j, upon which the lever J rides by means of a notch kept in engagement therewith by virtue of the spring p, secured on arm P and bearing on lever J, as shown. Upon the upper side of tilt-arm H is a lug, i, designed to engage the periphery of check-disk f and the notch n therein. The other end of tilt-arm H, by means of a pin, retains the fly g, so as to keep the clock-train at rest. The retaining device is shown in normal position. Obviously, when the magnet F draws down its armature the arm P will be lowered, and likewise lever J and the connected end of tilt-arm H, whereby the lug i will move out of notch n and the fly g will be released and the clock-train start by virtue of the wound spring q, contained therein. Shortly after the cylinder has started the stud o will trip lever J and bring the lug i on arm H against the periphery of the revolving check-disk f, so that when notch n is presented to the stud the same will enter therein and check the rotation of the cylinder and at the same time depress one end of arm H to catch and hold fly g. In this one revolution of the tripping-cylinder the two-way switch has been opened on one of its ways and closed on the other.

The actuating-magnet F is operated by a clock local circuit, provided with battery S. This circuit includes the coil of magnet F, and has a branch therein, provided with a push-button, Q, or hand device for closing the sub-circuit, to operate the magnet by hand, if so desired. This clock-circuit is open at a point, and at said open point is provided at the circuit-terminals with the contact-fingers v and w, respectively, the ends of which are free, they being suitably mounted.

The spring-actuated clock-work T is provided with a suitable housing-casing, and may be kept constantly in motion.

To the outside of the clock-work frame, and on the end of the second-arbor, is keyed the disk s, provided with a contact-spur, u. On the outer end of the minute-arbor is keyed a disk, m, provided with twelve radially-projecting contact-spurs, x, on the periphery thereof. These disks s and m are kept in electrical communication. The terminal contact-finger w is adjusted within reach of the spur u on disk s, which brushes over the finger once every minute. The finger v is adjusted to lie within reach of spurs x on disk m, which brush over said finger one every five minutes. From this construction, the contacts of the respective spurs and their fingers will coincide once every five minutes, and will then close the clock-circuit, and thereby actuate magnet F, whereupon the clock-train will start and operate the two-way switch, as above described.

By the use of the two revolving contacts m and s, respectively, I secure a very perfect and brief contact, since, by virtue of the disk s revolving once a second, the contact of its spur u with the contact-finger w must be necessarily the fraction of a second. This brevity of contact serves to preserve the battery, and, moreover, when a powerful battery is used the short contact will prevent the apparatus from heating.

The back contact-stop, b, of the two-way switch is connected with local ground G', and in this ground-connection is included the hand-switch Y and the relay K, the armature of which governs a key for making and breaking a local circuit. The local circuit is supplied with electric current by battery L, and is made over the coil of the rheotome relay V, and over the armature lever or vibrator U and contact U' thereof. The local circuit has two branches having the common branch points X' and X². In one branch of said local circuit is arranged the bridging device, consisting of a movable body, v', adapted to be pushed under the movable latch w', and in contact with the point u' of said circuit, whereby the previously-open circuit may be closed thereover. The bar a' is provided with a rubber casing and is set rigidly in position to afford a yielding stop to the bridge v', which is held by said latch until the push-bar d², Fig. 2, is pushed on its length to raise the latch and allow the bridge to move out of contact. The free end of vibrator U is provided with a bell-tap, e', which plays upon a bell, b'. In the other branch of the local circuit is situated the ordinary form of visual annunciator Z, provided with the indicating-openings z, for designating the certain connected circuits by displaying an assigned number, when said circuits are acted on, in a manner well known.

In the diagram of Fig. 1 a portion merely of the annunciator is shown, with one displaying opening therein, as assigned for the single main shown in said figure. The armature-lever k of relay K, together with its stop-contact k', lies in the branch with the annunciator Z and acts as a controlling-key for opening and closing said branch, in an obvious way. In the same branch with the annunciator Z is arranged a one-way switch consisting of a contact-finger, l, provided with one way or contact, y, onto which the finger may be switched and closed by tripping the free end of said finger. The tripping-cylinder D' is constructed precisely like the described cylinder D, and is likewise mounted in frame B and actuated by clock-train A, controlled by the moving contacts m and s indirectly, as in the case of cylinder D. The switch ly is mounted on the insulating bodies $c^2$ and $c^3$ in the same way as the two-way switch atb, above described. Considering the moving contacts s and m as actuated by a constantly-moving motor or clock-work, every five minutes the clock local circuit will be closed, the magnet F will release clock-train A, and the cylinders D and D' will perform one revolution and come to rest, thereby switching the two-way switch atb off of the line and onto the local ground G'. If when this occurs the main line is in proper working condition, the line-ground G will find local ground G' and thereby cause the actuating-relay K to draw down its armature and operate its key to break the branch of the local circuit established thereover. At the same time the switch atb is switched the switch ly is likewise operated and will close the branch of the local circuit in which it lies. However, this will effect no result as to the contained trouble-signal devices, since the key controlled by relay K has opened the branch at that point. On the other hand, if when the switches are operated the line is defective with a break or a ground therein, the line-ground G cannot find local ground G' because of said defect, so that relay K will not operate the adjacent key to break the local circuit, which will then be closed by virtue of the one way switch, and the vibration of the rheotome will ring the bell-alarm by reason of magnet V drawing down its armature. The vibrator in its first motion will push bridge v' under latch w', and close the breach in that branch permanently. This first impulse over the branch containing the annunciator serves to actuate the same and display an assigned number. The switch ly now opening, the magnet V is demagnetized, and the armature thereof carries the vibrator away from the bell and against contact-stop U', whereupon an impulse is sent over the bridge, the magnet, vibrator, and stop, and the vibrator is again forced against the bell to ring it. Thus this make-and-break action is maintained to cause the rheotome to sound a continuous bell-alarm.

The moving contacts may be mounted on the hour and minute arbors, respectively, to increase the period of operation, or there may be other equivalent ways adapted for such intermittent operations, as the intervals thereof may be desired to be increased or diminished.

The apparatus may be readily used in testing telephone-circuits, alarm systems, and all kinds of electric systems.

Having thus described my invention, I claim as new and desire to secure by Letters Patent—

1. In a circuit-testing apparatus, in combination, a circuit and a normally closed line ground-connection therefor at a central-office, a main battery and a recorder-relay included in said connection, a series of signaling mechanisms each controlling a normally-open ground at distant points on said circuit, a two-way switch situated in one branch of the circuit at the central office, a normally-open local ground adjacent to and governed by said switch, a relay included in said local ground, and means for operating said switch periodically, whereby the circuit may be opened on itself and closed on the local ground in testing.

2. In a circuit-testing apparatus, in combination, a circuit and a line ground-connection at a central office and normally closed thereon, a main battery and a signal relay included in said connection, a series of signaling mechanisms each provided with an open ground and at distant points on said circuit, a two-way switch located in one branch of said circuit at the central office, a normally-open local ground adjacent to and controlled by said two-way switch, a local circuit controlled by a relay included in said local ground, a rheotome actuating an alarm-signal and included in said local circuit, a circuit opening and closing device included in one branch of said local circuit and operated by said rheotome, an annunciator included in the other branch of said local circuit, a key and a one-way switch situated in the branch with said annunciator and in reverse relative conditions, the said key controlled by the relay included in said local ground, means for periodically operating the one-way switch, and means for periodically operating said two-way switch, whereby the circuit may be broken and closed on the local ground and the local circuit be controlled in testing.

3. In a circuit-testing apparatus, in combination, a circuit and a normally-closed line ground-connection therefor at the central station, a main battery and a recorder-relay located in said connection, a series of signaling mechanisms at distant points on said circuit and each controlling an adjacent open ground, a two-way switch included in one branch of the circuit at the central office, a normally-open local ground adjacent to and controlled by said two-way switch, a relay included in said local ground, a local circuit governed by said relay, a rheotome actuating an alarm-signal and included in said local circuit, a circuit closing and opening device included in one branch of said local circuit and operated by said rheotome, an annunciator included in the other branch of said local circuit around said device, a one-way switch and a key included in the branch with said annunciator and in reverse relative conditions, said key actuated by said relay, means for periodically operating the one-way switch, means for periodically operating said two-way switch, one or more motors for actuating said periodically-operating means, a clock-circuit and an included actuating electro-magnet governing said motor or motors, and means for periodically acting upon said sub-circuit, whereby the circuit may be opened on itself and closed on the local ground and the local circuit may be controlled in testing.

4. In a circuit-testing apparatus, in combination, a circuit provided at a central station with a normally-closed line ground-connection, a main battery and a recorder-relay included in said connection, a series of signaling mechanisms located at distant points on said circuit and each controlling an adjacent open ground, a two-way switch included in a side of said circuit at the central office, a normally-open local ground adjacent to and governed by said two-way switch, a relay included in said local ground, means for periodically operating said two-way switch, a clock-circuit, and an actuating-magnet included therein, said magnet controlling said periodically-operating means, and means for periodically acting upon said circuit, whereby the circuit may be opened on itself and closed on the local ground.

5. In combination, a circuit and an included actuating electro-magnet, a clock-train controlled by said magnet, two moving contacts electrically connected, said contacts acting each on said circuit, and means for actuating said contacts periodically, whereby said clock-train may operate periodically.

6. In combination, an open circuit and contact-fingers forming the terminals at the open point of said circuit, a clock-train and an actuating-magnet therefor included in said circuit, an open branch of said circuit and a circuit-closing hand device included therein, a constantly-moving clock-work having the second and minute arbors, each provided with circuit-closing disks in electric communication, the disk on said second-arbor provided with one contact-spur and tripping one of said terminal contact-fingers, and the disk on said minute arbor provided with one or more contact-spurs and tripping the other said terminal contact-finger, whereby said circuit may be closed and the clock-train started upon coincident contacts of the contact spurs and fingers, respectively.

7. A circuit-testing apparatus, consisting of the following combination: a circuit provided with a normally-closed line ground-connection at a central office, a recorder-relay and a main battery included in said connection, a series of signal mechanisms at distant points on said circuit and each controlling an adjacent open ground at each of said points, a repeating or signaling device or relay in each branch of said circuit at the central office, a two-way switch included in one side of said circuit at the central office and consisting of a trip-finger, a coacting front and back contact therefor, and an insulated rotary cylinder provided with a cog for switching said finger, a wound clock-train for actuating said two-way switch, a local ground connected with one of the contacts of said two-way switch, an actuating-relay and a grounding hand-switch included in said local ground, a local circuit, including a rheotome, and the circuit made over an electro-magnet, and the vibratory armature-lever, and the contact-stop of said rheotome, said vibrator provided with a bell-alarm, a bridging device for closing one open branch of said local circuit, said bridge operated and closed by said vibrator, a visual annunciator included in an open branch around said bridging device, the key or armature-lever and contact-stop of said actuating-relay in the local ground included in the branch with said annunciator, a one-way switch included in the branch with said annunciator and consisting of a trip-finger provided with a contact, an insulated rotary cylinder provided with a cog for switching said finger, said cylinder operated by said clock-train, a clock-circuit, and an included actuating-magnet governing said clock-train, said clock-circuit provided with two moving contacts having different speeds, said contacts acting on said clock-circuit and regulated to make coincident contacts at predetermined intervals, whereby said clock-train may be released at intervals and the apparatus operated for testing, substantially as described.

8. The combination, with an electric circuit and contact-fingers included therein, of a slowly-moving contact wheel or disk engaging one of said fingers, and a rapidly-moving contact wheel or disk engaging another of said fingers, said contact-disks in electrical communication, whereby the circuit may be acted on upon coincident contacts of the contact-disks with their respective fingers.

In witness whereof I have hereunto set my hand.

G. F. BULEN.

Witnesses:
F. McGLOIN,
ALFRED R. KIRKUS.